(12) United States Patent
Schulze, Jr.

(10) Patent No.: US 6,233,564 B1
(45) Date of Patent: *May 15, 2001

(54) MERCHANDISING USING CONSUMER INFORMATION FROM SURVEYS

(75) Inventor: Everett E. Schulze, Jr., Aurora, CO (US)

(73) Assignee: In-Store Media Systems, Inc., Aurora, CO (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/835,105

(22) Filed: Apr. 4, 1997

(51) Int. Cl.[7] .................................................. G06F 17/60
(52) U.S. Cl. .............................. 705/14; 705/10; 235/380
(58) Field of Search ............................ 705/10, 14, 1; 235/375, 380

(56) References Cited

U.S. PATENT DOCUMENTS

| Re. 31,951 | 7/1985 | Johnson et al. | 179/2 |
|---|---|---|---|
| 4,603,232 | 7/1986 | Kurland et al. | 179/2 |
| 4,781,596 | 11/1988 | Weinblatt | 434/236 |
| 4,847,685 | 7/1989 | Gall et al. | 358/84 |
| 4,954,699 | 9/1990 | Coffey et al. | 235/462 |
| 5,353,218 | * 10/1994 | De Lapa et al. | 364/401 |
| 5,483,049 | 1/1996 | Schulze, Jr. | 235/383 |
| 5,496,175 | * 3/1996 | Oyama | 434/118 |
| 5,857,175 | * 1/1999 | Day et al. | 705/14 |

OTHER PUBLICATIONS

Anonymous, "Back to the future with a database", Chain Store Age Executive v69n5 (section 1) pp 78 May, 1993 Dialog record No. 00815250.*

* cited by examiner

Primary Examiner—Gilberto Barron, Jr.
(74) Attorney, Agent, or Firm—Sheridan Ross P.C.

(57) ABSTRACT

A system is provided for obtaining consumer related information using a number of data gathering networks. The obtained data is stored in a common database network that is accessible for processing and providing information about consumers in an understandable format in connection with targeting such consumers so that they will purchase certain products or services. These networks include a telecommunications survey network for obtaining information about the consumer and for generating interest in the consumer so that the consumer will provide further marketing information. A written survey network is utilized in obtaining additional information from the consumer through written survey questions. An interactive survey apparatus obtains consumer related information at shopping centers or stores and enables the consumer to benefit before the consumer purchases the product or service. A supplemental survey network allows the consumer to initiate the providing of consumer information to the system for subsequent use in targeting this consumer. In order to influence the purchases of consumers, the system uses consumer benefit receipts, such as coupons, checks, vouchers, rebates and discounts. One or more consumer benefit receipts are typically offered to the consumer as an incentive in obtaining the consumer information.

11 Claims, 6 Drawing Sheets

MERCHANDISING USING CONSUMER INFORMATION FROM SURVEYS

FIELD OF THE INVENTION

The present invention relates to obtaining marketing data from consumers particularly using a number of data gathering methods and apparatuses and storing the data in a common database for subsequent access and use in targeting consumers.

BACKGROUND OF THE INVENTION

Manufacturers and sellers of products and services, including wholesalers and retailers, use a variety of marketing techniques to attract and maintain loyal customers. Billions of dollars are spent on promoting and advertising products and services. However, a sizable percentage of the marketing dollar that is spent encompasses consumers who essentially have no interest in the advertised product or service. Coupons, for example, are widely circulated and utilized to promote products identified by the coupons. A major objective of coupons is to motivate the consumer to buy the product identified by the coupon. Coupons are particularly advantageous when a consumer purchases a product that the consumer would not normally purchase. That is, the coupon acts as an incentive for the consumer to buy the product. Not only does the marketer of the coupon associated products benefit from a coupon that attracts a new customer, the individual customer gains by receiving additional value for purchasing a desirable product in the form of a discount or other worthwhile incentive. The coupons are made available to potential consumers through a variety of distribution channels, such as newspapers and home mailings. A great majority of such coupons, however, are not redeemed. Particular methods and apparatuses have previously been advanced for the purpose of increasing the success of such coupons. One known method generates coupons at the time of check-out. The generated coupon depends on one or more products that were purchased. For example, the generated coupon identifies a product that directly competes with a product that was just purchased. The newly generated coupon can then be redeemed the next time the consumer shops for such products. A drawback to this marketing approach relates to timing of the purchase using such a coupon. The expectation is that this consumer will bring this coupon with her the next time she shops. This does not always occur due to the time delay between the two shopping events. Another devised method is directed to generating coupons in or near the store before shopping is completed. Such coupons are generated for consumers who are expected to redeem the coupons and who have the opportunity to select the products identified in the coupons before they are finished shopping.

Despite these numerous marketing programs that have been advanced, a more effective and efficient way of targeting consumers for particular products and/or services continues to be a major goal of manufacturers and marketers. As with other fields of commerce, when more information is available concerning consumer buying habits and buying intentions, a more effective marketing direction can be formulated and implemented. The problem arises as to how to identify, obtain and use specific information, directed to a specific customer, in an optimal way, particularly in a timely fashion—such as before the purchase of the product or service of interest has occurred.

With respect to consumer products and services, it would be advantageous to know the types or groups of food products that a particular consumer purchases on a regular basis and the brand names of such regularly purchased products. With this information, one or more incentives could be provided to the consumer directed to having the consumer switch brand loyalties to a competitive product. Likewise, highly beneficial consumer information includes the intention of a particular consumer to purchase in the near future such consumer goods as a vehicle or a major appliance. Once that intention is made known to the marketer, advertising efforts and incentives can be made to this particular purchaser for the purpose of influencing the brand of product or consumer item that is purchased. A key aspect relates to identifying and obtaining consumer related information in a timely manner. If such information is not obtained in a reasonably prompt manner, the consumer might have already purchased the product of interest.

The conducting of market surveys is well-established. A known system and method conducts surveys electronically utilizing a host system and a number of panelist stations. Survey questions are downloaded selectively to one or more panelist stations. Response data from the survey questions is transmitted to the host system for processing.

Even though such market survey systems have been devised, as well as widespread use of consumer purchasing incentives, such as coupons, is occurring in the marketplace, there remains a strong demand for a system and method that more directly targets consumers, who have an expressed interest in defined consumer items, but before they actually purchase such items from manufacturers or marketers.

SUMMARY OF THE INVENTION

In accordance with the present invention, a system is provided for obtaining and using information collected from a number of consumers over different time periods. Incentives in the form of cash, discounts, coupons and rebates are offered in predetermined ways to consumers in conjunction with obtaining and using such information. The obtained information is used to identify consumers who are more likely to purchase certain products or services. Based on that likelihood, such consumers are targeted by manufacturers and marketers of such products or services.

The system includes a number of sub-systems. A telecommunications survey network is involved in obtaining initial information about consumers including related to their purchasing history and/or purchasing plans. At this time also, the consumer is asked whether or not she might be interested in becoming involved in a consumer program that benefits her and her household when purchases are made from certain manufacturers or sellers. Data obtained by way of the consumer responses to such inquiries is downloaded to a database network that stores such data for desired usage, such as sorting or organizing the data. The database network is also utilized in uploading data related to the identity of consumers to be contacted by the telecommunications survey network.

The system further includes a written survey network. This network typically is invoked for a particular consumer after the telecommunications survey network has obtained initial information about the consumer and this consumer has expressed a desire to become involved with the consumer program implemented by the system. The written survey network provides written survey questions to the consumer. These questions are different from questions asked of the particular consumer using the telecommunications survey network and are more detailed in nature directed to consumer purchasing history. In one embodiment, such written questions are mailed to the designated consumer, who then has the opportunity to insert answers or otherwise respond to the questions at her convenience. Preferably, the written survey network sends the particular consumer an identification card, which identifies the particular consumer as being a member of this consumer program. This identification card enables the consumer to participate in obtaining consumer benefits when survey questions are answered by the consumer and when the consumer purchases certain products or services. The written survey network receives the response results from the consumer to the written survey questions and is involved in storing these responses with the database network.

With regard to use of the identification card, the system includes an interactive survey apparatus that is typically found in or near a shopping center or store that markets or sells the products or services that are being promoted by the consumer program of the present invention. The interactive survey apparatus includes an inlet that accepts the identification card of the particular consumer. Based on reading the identification information from the card, the system is able to download desired information or data to the interactive survey apparatus. The downloaded information can be used to generate a consumer benefit receipt. The benefit receipt is outputted by the interactive survey apparatus for removal by the consumer. The benefit receipt can include one or more items that are intended to benefit the consumer in connection with her purchasing of products or services, such as a coupon, voucher, discount, rebate or check that is directly convertible to cash, provided that certain products or services are purchased. The interactive survey apparatus is also involved with requesting further consumer or marketing related information. Based on the identification information and previously obtained information about the consumer, survey questions can be tailored to the particular consumer. In connection with providing incentives to the consumer for responding to such survey questions, one or more consumer benefit receipts are made available to the consumer immediately after certain survey questions are properly responded to. For example, after responding to certain questions, a benefit receipt in the form of a check that is directly convertible to cash is provided to the consumer. Like the telecommunications survey network and the written survey network, the data obtained from the consumer by the interactive survey apparatus is downloaded to the database network.

An additional sub-system for obtaining and gathering information from particular consumers is identified as the supplemental survey network. This network is characterized by the consumer initiating the providing of consumer related information to the system, particularly the database network. The system is established to gather as much useful consumer information that the consumer is willing to provide since more information usually means greater success in targeting consumers for products or services. Incentives are offered by the system to encourage or facilitate consumer initiation of the supplemental survey network. That is, consumer benefit receipts are provided to the consumer who properly responds to the questions from the supplemental survey network. Such consumer benefit receipts might include a check directly convertible to cash or other prizes and rewards. The consumer response data from this network is downloaded to the database network.

The system also includes a host that communicates with the database network and is able to access such data. The host functions to provide such consumer information in a presentable or understandable form so that it can be provided to manufacturers, sellers and others for whom such information is of value in targeting consumers for their products or services.

In the context of these sub-systems, methods of operation of the present invention can be defined. The database network downloads consumer identification information to the telecommunications survey network. Such consumer identification information is intended to reflect—those consumers who might be interested in participating in the consumer program. The telecommunications survey network initiates the contact with the particular identified consumer. In the case in which the contacted consumer satisfactorily responds to at least certain questions, the system decides that an identification card should be sent to that consumer. Additionally, the consumer response data obtained by the telecommunications survey network is stored in the database network. Preferably, with the sending of the identification card, the written survey network sends written survey questions to this consumer. Any responses to the written survey questions are input to the database network by the written survey network.

After receipt of the identification card by the particular consumer, it can be used with the interactive survey apparatus to provide more consumer information and receive consumer benefit receipts. In that regard, upon insertion and reading of the identification card by the apparatus, previously collected marketing related information associated with this identification card can be obtained from the database network and utilized by the interactive apparatus survey network in providing consumer incentives to purchase certain products or services and/or responding to further survey questions. By way of example, the interactive apparatus survey network might output a coupon that grants the consumer an amount off the regular purchase price of a product that a participating manufacturer or marketer wishes to promote to this particular customer. With regard to enticing the consumer to respond to the survey questions offered by the interactive apparatus survey network, a further benefit receipt is outputted to the consumer in the form, for example, of a check directly convertible to cash.

This same consumer with the identification card is able to take advantage of the supplemental survey network. By accessing this network, the consumer is presented with additional survey questions that are intended to augment or enhance the database of information on this particular consumer. Typically, upon responding to these questions, the consumer is provided with one or more benefit receipts. A representative example of such a benefit receipt is a check for cash.

Based on the foregoing summary, a number of salient features of the present invention are readily discerned. System and method are provided for targeting consumers of certain identified products and services. Information is obtained about both the purchasing history and future purchasing plans of the particular consumer. This is achieved utilizing a number of cooperating networks that collect the consumer data and store it in a common database network. This consumer information is sorted and processed to better identify products and services that this consumer is expected to purchase. This is accomplished in an effective and timely manner. Each time the particular consumer uses her identification card and/or accesses the supplemental survey network, updated consumer information can be obtained. To encourage and motivate the consumer in connection with providing such information to the system, consumer benefit receipts are offered to the consumer. These include discounts, rebates, coupons and vouchers, as well as checks directly convertible to cash. The consumer benefit receipts are made available to the particular consumer before the anticipated purchase is made by this consumer. Consequently, the consumer is influenced to buy a competitive brand when the consumer intended to purchase a product from a different source. This results in a key marketing goal being met by a manufacturer or seller of the product that is competitive to the product that the consumer intended to buy before she was influenced by the incentive offered by the competitor.

Additional advantages of the present invention will become readily apparent from the following discussion, particularly taken together with the accompanying drawings.

DETAILED DESCRIPTION

Figure 1:
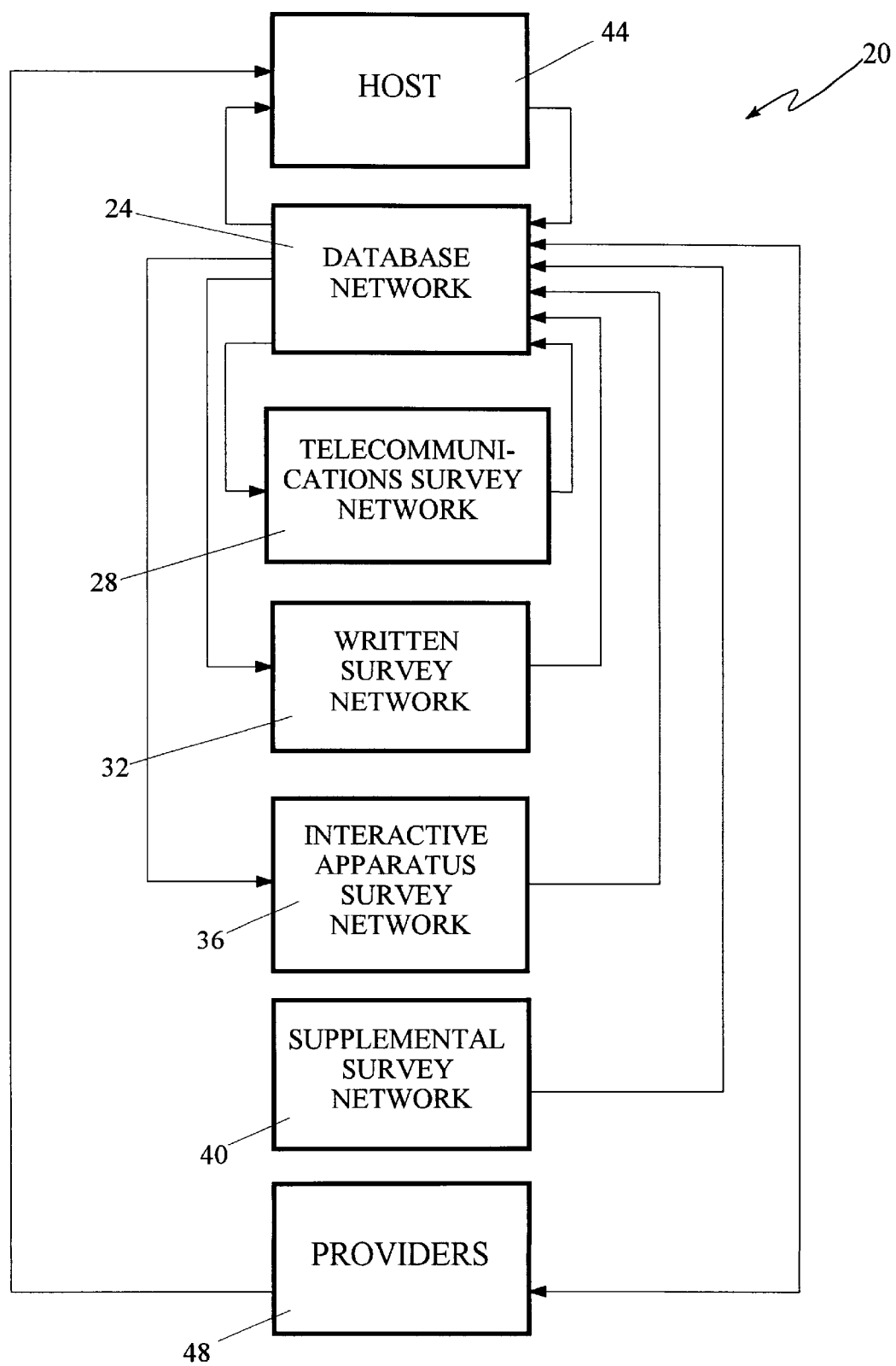
FIG. 1 is a block diagram of the present invention showing the multiple networks for obtaining and using consumer related information.

With reference to FIG. 1, a system 20 is illustrated in a block diagram that is used in obtaining and using marketing data gathered from a plurality of consumers. The system 20 includes a database network 24 that includes substantial memory or data storage locations for storing marketing-related demographic data associated with each of a large number of consumers. Such memory can be found at one location or facility or can be located at a number of facilities that electronically communicate with each other. The database network 24 is also responsible for preparing the data so that it is available in a suitable and advantageous format. Such preparation involves receiving the data and grouping data based on predetermined conditions using algorithms implemented by software, sorting the data or groups of data into one or more useful and previously defined categories of data, labeling, identifying or otherwise formatting such data related to facilitating the access and retrieval thereof and storing such data in the data storage locations. In accomplishing these responsibilities or tasks, the database network 24 can include one or more processors and associated peripheral equipment, together with communications equipment such as telephone lines, interactive cable TV, cellular systems, satellite usage, modems, as well as a combination of data communications systems that make up the Internet. The receiving and transmitting of such data are also accomplished using computer peripheral equipment such as marketing data previously stored using disk drives or stored on compact disks (CDs).

Important to the system 20 is the reliance on a number of different survey networks for gathering data from the consumers, with such data preferably being obtained in a desired predetermined order. The system 20 includes a telecommunications survey network 28 that is used in initiating contact with each consumer from which marketing data is being sought. The telecommunications survey network 28 generally relies on a voice transmission and subsequent receipt of voice data obtained directly from the consumer in response to questions asked of the consumer. This initial survey is relatively brief and may be utilized to verify the name and address of the particular consumer from whom more extensive marketing data will be subsequently requested. The telecommunications survey network 28 is involved in obtaining information as to the level of interest of the particular consumer in connection with participating in the program and services associated with the system 20. If the particular consumer expresses no interest, a decision can be made using the system 20, to the effect that this particular consumer should not be contacted or surveyed further, in the absence of some later indication of interest. Like the database network 24, the telecommunications survey network 28 relies on the same communications equipment for receiving and transmitting data. In particular, in obtaining the voice information or data from a particular individual or other members of the household of the particular individual, such contacting and surveying can be accomplished using ordinary telephone lines and cellular transmissions. However, the telecommunications survey network 28 need not be limited to strictly voice data. For example, the Internet or any other interactive apparatus, such as an interactive television could be utilized. Of course, as technology advances, voice data can also be obtained from such telecommunications systems as well. As diagrammatically illustrated in FIG. 1, the telecommunications survey network 28 communicates with the database network 24 for transmitting or inputting its obtained or gathered data. Such a transmission can be implemented in many different ways, including the automatic and direct transmission from the telecommunications survey network 28 to the database network 24 using a predetermined protocol. In one or more implementations, some manual or human intervention is utilized in connection with controlling the input of marketing data from the telecommunications survey network 28 into the database network 24. Alternatively, automatic checks or verifications involving the gathered data might be made using software implemented algorithms that relate to the control of the transmission of such data from the telecommunications survey network 28 to the database network 24.

A written survey network 32 is also a part of the system 20 and is useful in gathering substantially more consumer information than that obtained by the telecommunications survey network 28. The written survey network 32 is used to request information from the consumer such as: food, beverage, household, toiletries and cosmetic products that are being purchased; occupation; hobbies; club or organization memberships; income; investments; credit cards; education; types of books read; whether or not this consumer is a smoker; and anticipated major purchases, such as a home, vehicle or home appliance. In accordance with the written survey network 32, such extensive market survey questions are presented in a written format, such as by way of written questions with insert areas or boxes for providing answers, although computer or other controller interactive apparatus can be utilized that displays the written questions and permits the input of responses that are displayed before being transmitted. The written survey network 32 also communicates with the database network 24. Like the telecommunications survey network 28, diverse input implementations and methods can be utilized in order to provide the necessary or desired information gathered by the written survey network 32 to the database network 24. With respect to the delivery and receipt of written surveys, any one of one or more transport or communication delivery systems can be utilized, such as U.S. mail service, private carrier, electronic mail and hand delivery to the particular consumer or her household. The written survey network 32 can also include the previously noted communications equipment for receiving and transmitting data and survey information that were utilized in connection with the database network 24 and the telecommunications survey network 28.

The written survey network 32 is further characterized by the providing of an identifying unit, such as an identification card or other card that includes a barcode, magnetic strip and/or identification number and/or identifying sources to be utilized, such as a smart card or stamp, visual image, and/or finger or other print. The identifying unit is useful in offering incentives or advantages to the particular consumer who has the identifying unit that are not offered to others who do not have such an identifying unit that can be made available to or used by the system 20 of the present invention. As will be discussed later herein, the identifying unit enables the particular consumer to participate in opportunities for receiving additional value, such as product discounts and/or cash itself. The identifying unit typically is provided with a written survey to the particular consumer or that consumer's household when the more detailed and extensive survey questions are received. Generally, the identifying unit will not be sent to a particular consumer or household without obtaining a threshold, positive response from that consumer when the telecommunications survey network 28 was utilized in contacting the consumer.

The system 20 further includes an interactive apparatus survey network 36, which includes a plurality of interactive apparatuses that are conveniently located in or near point-of-sale retail outlets, such as supermarkets or shopping centers. Like the other survey networks previously described, the interactive apparatus survey network 36 is also useful in gathering consumer or marketing information based on an interactive process involving an interactive apparatus and a consumer. Additionally, each interactive apparatus is capable of outputting a benefit receipt to the consumer who interacts with such an apparatus. Preferably, the identifying unit, such as the ID card, of the particular consumer is input to an interactive apparatus. The ID card is recognized or read, and this information is utilized in presenting survey questions and/or providing benefit receipts to the consumer, such as a discount coupon, bonus points or a check directly convertible to cash, depending upon whether or not certain conditions are met. A more detailed description of a representative interactive apparatus will be provided later herein. The interactive apparatus is able to communicate beyond its physical location so that survey information can be transmitted and subsequently received by the database network 24. Like the other survey networks, such communication can be accomplished using one or more of a number of computer peripherals and telecommunications equipment, as previously noted during the description of the other networks.

The remaining information gathering network of the system 20 is identified as a supplemental survey network 40 that is characterized by the gathering of marketing information essentially through the initiative of the particular consumer herself. Instead of the system 20 making the initial contact to seek marketing information from a particular consumer, the particular consumer initiates the contact by identifying himself/herself to the system 20 using the supplemental survey network 40 and communicating that the consumer wishes to become involved in supplying further marketing information related to the consumer to the database network 24. Such marketing information is intended to be a supplement or addition to previously provided information related to the particular consumer. For example, the consumer might wish to inform the system 20 that the consumer intends to make a major purchase within a relatively short time period, and this information is contrary to previously provided information or information is being provided that was not input before by the consumer. With respect to encouraging or offering incentives for the consumer to access and utilize the supplemental survey network 40, in connection with submitting such marketing information, the system 20 offers rewards or incentives to the consumers for their efforts including one or more distributions of checks for cash, coupons, prizes, discounts and rebates. That is, for providing further consumer information that is useful to the system 20, the consumer is rewarded by one or more of such items. Like the other survey networks previously discussed, data and survey information is obtained using the same or similar technologies. It is also preferred that in order to initiate the supplying of further marketing data using the supplemental survey network 40, the particular consumer must identify himself/herself by means of the identifying item, such as the information on an ID card.

A related application of the supplemental survey network 40 involves receipt of information or inquiries by consumers concerning products or services that they might wish to purchase and are seeking an optimum price or other most favorable transaction factors, such as delivery time, payment timetable, product quality, etc. In such a case, the consumer relates his or her needs and/or preferences for one or more particular products/services using the supplemental survey network 40. The network 40 takes this information and requests any other information appropriate for satisfying the particular consumer. The network 40 has available identified goods or services, together with transactional factors associated with them. System 20 including the supplemental survey network 40 are involved in an analysis of the obtained information and the providing of a reply to the particular consumer. The reply can take many forms, including a list of selections that are best intended to satisfy the particular consumer. In this way, the time spent by the consumer in obtaining relevant data before deciding on a purchase of a particular item is substantially reduced.

The system 20 also preferably includes a host 44 that oversees the operation of the system and is involved with monitoring responsibilities and control functions in connection with supervising the obtaining and using of the information or data received by the database network 24 from the various survey networks 28–40. The host 44 includes one or more processors, as well as associated processing components and peripheral equipment. In the preferred embodiment, the host is situated at a central facility and communicates with the database network 24 in conjunction with the overseeing operations. The host 44 also communicates with computers and communications systems of manufacturing, sales and/or marketing entities, identified as providers 48. The providers are able to obtain marketing data in a useful format, such as being particularly customized for their needs or objectives. The organized consumer information can then be utilized to target certain consumers or demographics that, based on the marketing data, would have great interest in the particular provider's products. Additionally, the providers 48 are able to input requests to the host 44 in connection with requesting marketing information and providing information or data that is useful in organizing or controlling the database network 24, as well as supplying information that can be used to generate survey questions and/or reward items associated with certain products of one or more providers 48.

Figure 2:
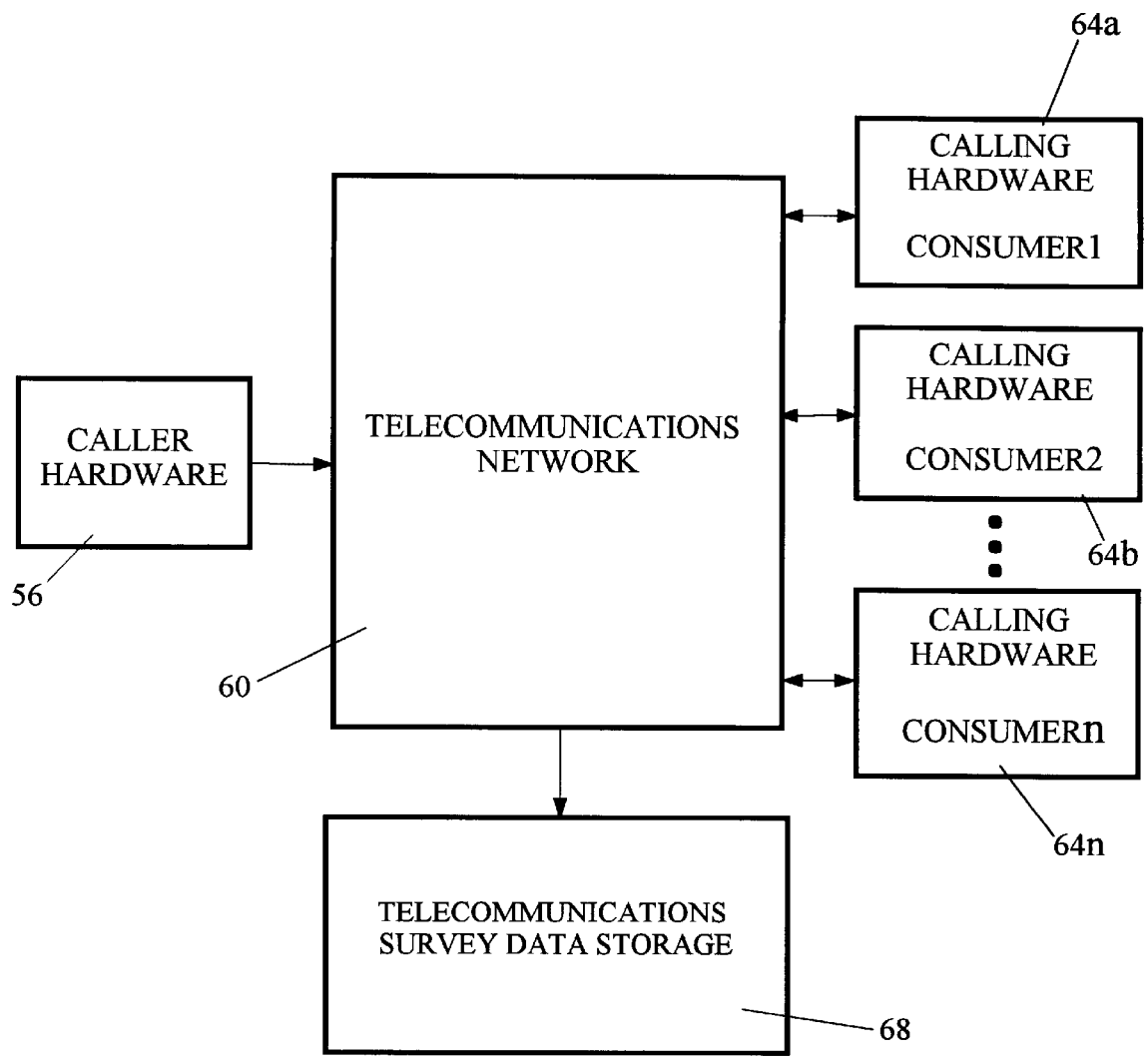
FIG. 2 is a block diagram of the telecommunications survey network.

With reference to FIGS. 2–5, additional details of the different survey networks 28–40 are described next. As seen in FIG. 2, the telecommunications survey network 28 includes caller hardware 56 located at a system 20 facility for use in initiating the contact by the system 20 with a number of consumers. As previously noted, the caller hardware 56 can include conventional or presently available telecommunications equipment such as ordinary telephones and telephone lines and cellular telephone transmission equipment, particularly in the case of transmission of voice. Although not presently anticipated to be used as the primary source of caller hardware, computer equipment including modems can be utilized. Transmitting voice over the Internet, after it is practically available, is another option for the field of caller hardware 56. A telecommunications network 60 communicates with the caller hardware 56 and, as just noted, can include the Internet. When ordinary available telephone equipment is utilized, any such telecommunications network 60 can include the networks that are available through local and long distance telephone service providers. Voice information that is transmitted is received by a selected one of calling hardware 64a, 64b . . . 64n. Each of the calling hardware 64 represents communications equipment available to a particular consumer who is contacted by the system 20. The calling hardware 64 normally includes ordinary telephones and telephone lines found in typical households. Each calling hardware 64 is able to respond to the inquiries from the caller hardware 56 as part of the participation by the particular consumer with this survey network 28. Survey questions using the network 28 are useful in establishing the level of interest by the consumer in the programs of the system 20, as well as verifying or obtaining preliminary marketing data from the particular consumer. The responses from the particular consumer are received by the telecommunications network 60 and routed to a telecommunications survey data storage 68, which is part of the database network 24. The telecommunications survey data storage 68 can constitute, in one embodiment, storage of marketing data before it is organized. The telecommunications data storage 68 may also be simply portions of the main storage area of the database network 24. In the embodiment illustrated in FIG. 2, it is preferred that one set or group of caller hardware 56 be able to communicate with, at one time, a selected one of a vast number of calling hardware 64, with each such calling hardware 64 typically being associated with a particular consumer. As can be appreciated, a plurality of caller hardware 56 could be provided, with each being able to initiate communication with any one of a number of calling hardware 64 at any instance in time, with each such calling hardware 64 being associated with the particular consumer that is being contacted.

Figure 3:
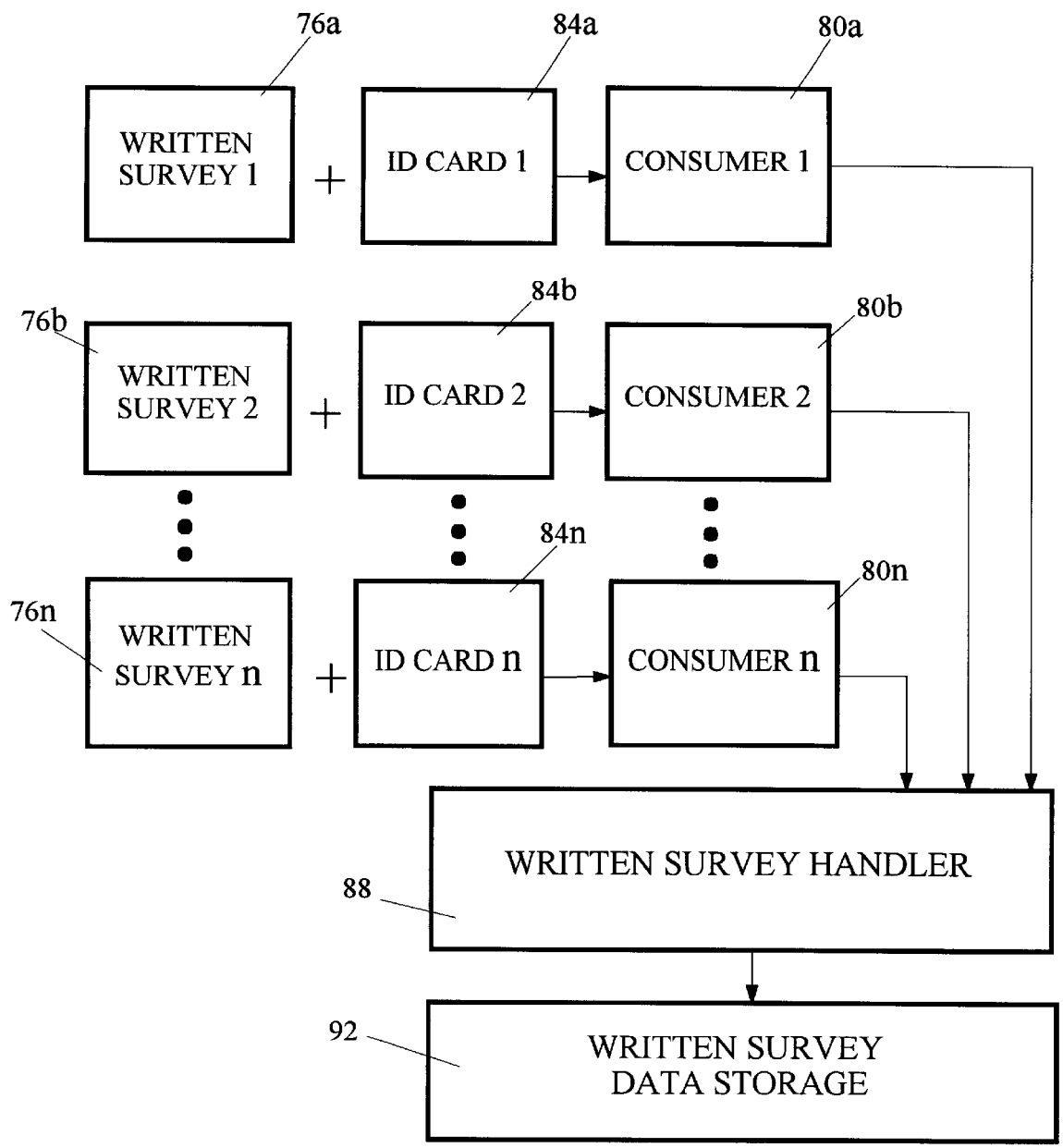
FIG. 3 is a block diagram of the written survey network.

With reference to FIG. 3, a more detailed block diagram of the written survey network 32 is provided. As previously noted, this survey network 32 involves a more extensive gathering of consumer or marketing data. As conveyed by FIG. 3, a number of written surveys 76 are provided in accordance with the process used by the system 20. Each of the written surveys 76 is sent to a consumer, who has at least some interest in participating in the system programs. That is, written survey 76a is provided to consumer1 80a, written survey 76b is sent to consumer2 80b and so forth, including written survey 76n being sent to the $n^{th}$ consumer 80n. Each of the written surveys 76a . . . 76n can be exactly the same, i.e., requesting the same information and asking the same questions. Alternatively, each of such written surveys 76a . . . 76n could have at least some different information being sought or questions being asked. Based on the results, for example, of the telecommunications survey network 28 inquiries to the consumers 80a . . . 80n, different or the same written survey 76 could be provided by the system 20.

In the preferred embodiment, in addition to the written survey 76 being provided to a consumer 80, an identifying unit, such as an identification (ID) card 84 is also made available to the consumer 80. The identification card 84 includes information that identifies the consumer 80 to whom it is sent and may also include other information that constitutes marketing or consumer data. Each identification card 84a . . . 84n associated with its respective consumer 80a . . . 80n has particular utility in invoking certain functionalities of the interactive apparatus survey network 36, as will be subsequently explained herein. Usually, an identification card 84 for a particular consumer 80 is generated after the threshold level of interest in the system 20 has been expressed by the particular consumer 80.

The written survey generally includes a substantial number of survey questions that are to be answered by the particular consumer, which questions are arranged in a suitable manner and directed to topics that were previously noted in the initial discussion of the written survey network 32. For each written survey 76, the consumer 80 inserts or otherwise provides a response to the survey information requests. Upon completion of the written survey 76, it can be returned to the system 20, such as by a mail or package service, to the system location that is established to be responsible for incorporating such survey data into the database network 24. By way of example, a written survey handler 88 might be utilized for receiving the returned written surveys 76 and preparing them for inclusion in the database network 24. Such a written survey handler 88 might include necessary personnel for organizing or otherwise arranging the written surveys 76 for automatic processing using appropriate computerized equipment that is able to electronically gather the information and store it in a written survey data storage 92, which is part of the database network 24. Like the telecommunications survey data storage 68, the written survey data storage 92 can constitute or be considered a portion of the data storage of the database network 24 or could be utilized as a temporary storage for such data for subsequent sorting, categorizing or otherwise providing this gathered consumer data in useful files or records. The results of the written surveys 76a . . . 76n are intended to constitute substantial marketing data that can be analyzed and presented for use by one or more providers 48 in conjunction with targeting participating consumers for the products and services offered by such providers 48.

Figure 4:
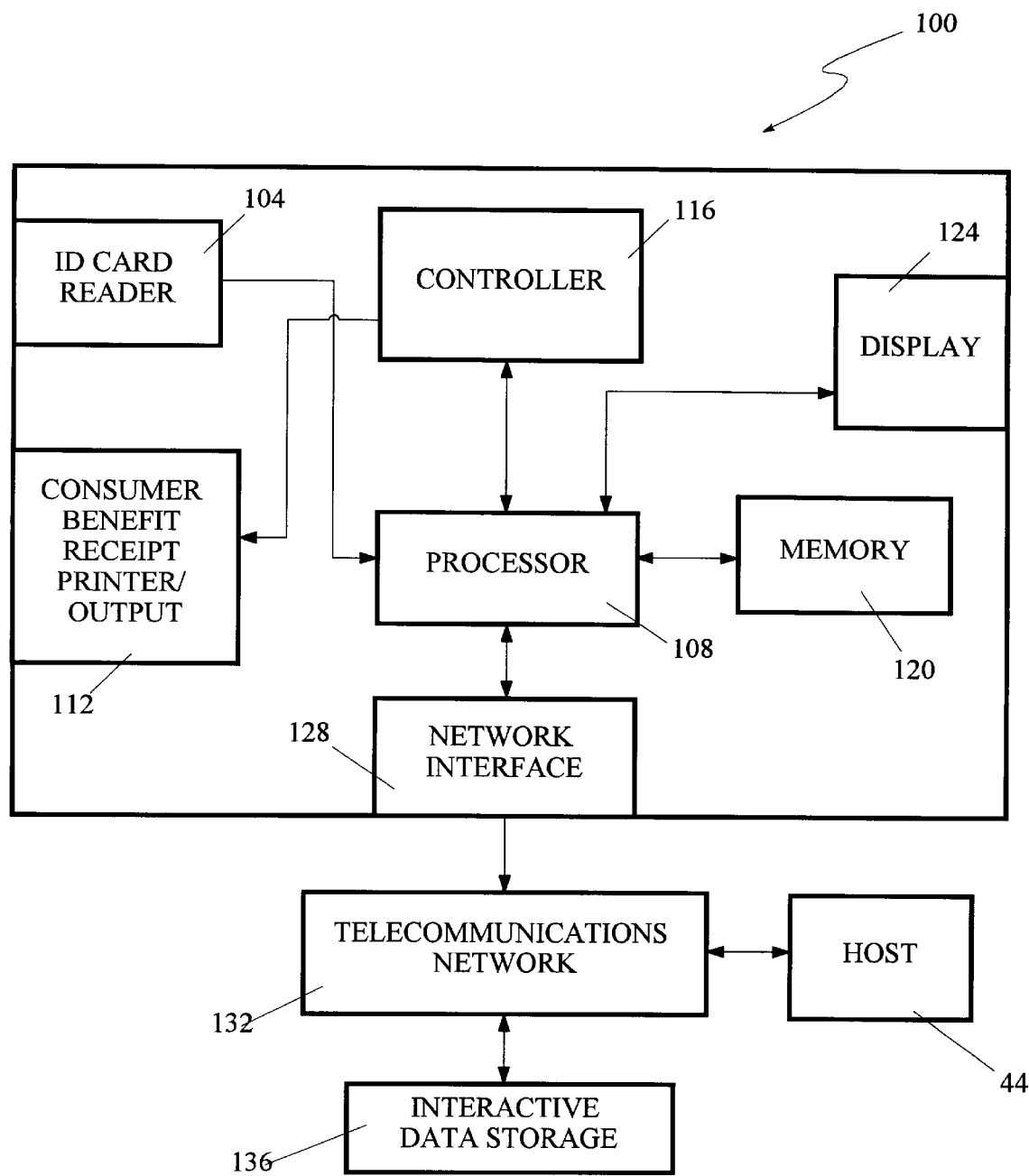
FIG. 4 is a block diagram of the interactive apparatus survey network.

With reference to FIG. 4, a representative interactive apparatus 100 of the interactive apparatus survey network 36 is illustrated in block diagram form. Such an interactive apparatus 100 is one of many such apparatuses 100 that are conveniently located for use by consumers and preferably those consumers 80 who have received an activated identification card 84. The interactive apparatus 100 includes an ID card reader 104 that is contained in a relatively small housing unit, such as a kiosk-like structure. The ID card reader 104 receives an ID card 84 through a slot in the housing of the interactive apparatus 100 and reads information related to identifying the consumer or holder of the particular ID card 84. The ID card reader 104 outputs a reader signal that includes the identifying information, which is transmitted to a processor 108. The processor 108 receives inputs including that from the ID card reader 104 and analyzes data and other information represented by such signals using executable, applicable software. In conjunction with executing applicable software, the processor 108 uses identification information obtained from an ID card 84 to control operations of the interactive apparatus 100. From the identification information, the processor 100 can obtain information that will enable it to initiate and continue steps associated with interacting with the particular cardholding consumer. Based on previously gathered marketing-related data from the particular consumer, the processor is involved with generating one or more consumer benefit receipts, such as coupons, checks for cash, tokens, vouchers, prizes, samples, games, discounts and/or rebates. By way of example, the processor 108 may be involved with determining that a particular coupon should be printed that identifies a product and a particular discount that should be given to the consumer who purchases that product. This determination can rely on marketing data from this particular consumer 80 that is obtained previously using one or more of the previously discussed survey networks including the telecommunications survey network 28, written survey network 32 and supplemental survey network 40. Such a coupon or other consumer benefit receipt could also be based on or generated as a result of information received from the consumer 80 by the interactive apparatus 100, either previously or during the current use of the interactive apparatus by this particular consumer 80.

In one embodiment, the ID card 84 is provided based on information received by an interactive apparatus 100. By means of queries using a touch screen or display, for example, the interactive apparatus 100 is able to solicit the necessary information that can be analyzed in determining that the particular responding customer is to be provided with an ID card 84. The interactive apparatus 100 itself can then generate such an ID card 84 or such can be subsequently prepared and sent to this particular consumer.

As further illustrated in FIG. 4, a consumer benefit receipt printer/output 112 is part of the interactive apparatus 100 and is useful in producing and outputting one or more of the afore-identified consumer benefit receipts, such as a coupon for redemption when a particular product or service is purchased. Such a coupon typically includes the identification of the product or service and the amount of the discount, as well as the expiration date and, optionally, the location in the store by aisle and/or shelf of the product subject to the discount. The consumer benefit receipt/printer output 112 communicates with a controller 116 for directly controlling or overseeing the operation of the consumer benefit receipt printer/output 112. The controller 116 sends the necessary command or control signals, as well as necessary data for generating the determined coupon output, to the consumer benefit receipt/printer output. The controller 116 also communicates with the processor 108 in connection with receiving command inputs from the processor 108 and reporting status and other information back to the processor 108. A memory 120 also communicates with the processor 108 and typically provides temporary storage for data that the processor 108 utilizes in executing applicable software. The memory 120 can also include program storage for containing software used by the processor 108 in connection with operation of the interactive apparatus 100. The processor 108 also communicates with and controls a display 124 that is useful in communicating with the consumer or user of the interactive apparatus 100. Displayed information can be in the form of icons or other graphics, as well as printed words. The display 124 can also be used as an input device by which the consumer 80 touches or controls activation of controllable items that are displayed for interacting with the interactive apparatus 100. Outputs from the display 124 are input to the processor 108 for appropriate processing.

With respect to communications to/from the interactive apparatus 100, a network interface 128 is included. The network interface 128 incorporates the necessary hardware and protocol that enable data and other information to be communicated to the interactive apparatus 100 over a telecommunications network 132. As with the other communication networks for conveying data or other information, the telecommunications network 132 is able to communicate with an interactive data storage 136, which can be defined as part of the database network 24. The interactive data storage 136 is able to receive data or other information that might be provided by the consumer 80 who is utilizing the interactive apparatus 100 and which data or other information is useful in targeting that particular consumer 80 for one or more products or services of one or more providers 48.

In addition to data or other information being transmitted from the interactive apparatus 100, the network interface 128 is able to receive information or data from the telecommunications network 132, such as from the host 44. For example, the host 44 is able to download information that can be utilized by the processor 108 to provide information or present inquiries to the particular consumer 80, which inquires can also relate to the obtaining of marketing or other data, such as opinions or reactions sought from the particular consumer to one or more of many topics. That is, the interactive apparatus 100 can be utilized as a survey or opinion center and, even more particularly, the survey or opinion-related questions can be based on previously gathered information from this particular consumer that is currently using the interactive apparatus 100. Not only is the host 44 or other system unit able to download such information or data, the capability exists to download executable software to be stored in the program storage area of the memory 120. Such software can be applicable to the particular consumer, based on the previous information gathered about the consumer. Alternatively, the survey questions or inquiries may have little or nothing to do with marketing information and can be strictly concerned with obtaining opinions or other information related to a variety of subjects or interests, such as political or social topics.

In connection with the interactive apparatus functioning as another survey center of the system 20, incentives in the form of one or more consumer benefit receipts can be generated substantially immediately after the consumer's participation in the survey provided by the interactive apparatus 100. As an example, in prompting and seeking input information from the consumer using the display 124, there might be levels or series of survey questions. If the consumer 80 properly responds to one or more displayed questions, the processor 108, recognizing such an input or inputs from the consumer initiates a command to the controller 116 that it control the outputting of a consumer benefit receipt, such as a check that can be endorsed for cash, from the consumer benefit receipt printer/output 112. As a result, the consumer receives a benefit in the way of monetary compensation for responding to the particular information request or survey questions. In this way, the consumer immediately receives a benefit. The interactive apparatus 100 acts like an electronic game in providing enjoyment in the form of an immediate and desirable output that rewards the customer for interacting with it. As can be appreciated, as more and more requests are met or questions answered from one or more series thereof, one or more additional consumer benefit receipts can be output. Relatedly, the information requested can be directed by one or more of the providers 48 that wish to target this particular consumer, based on recognition of the consumer's ID card 84.

The interactive apparatus 100 also includes monitoring hardware and/or software that is used to ensure that a particular ID card holder does not use the interactive apparatus in an unsuitable way. This capability is advantageous when opinions or survey responses are being obtained and the outcome can be improperly affected by one or more consumers introducing a bias due to excessive inputs or responses by the same customer or customers. A check can be made as to whether or not a particular ID card 84 has been entered and utilized for one or more specific opinion requests or survey questions. If so, any further response based on such an ID card 84 would not be permitted or would not be entered and taken into account in connection with any subsequent analysis of the requested information. Similarly, such monitoring features are useful in limiting excessive or other unwanted usage of the interactive apparatus by the same ID card.

Figure 5:
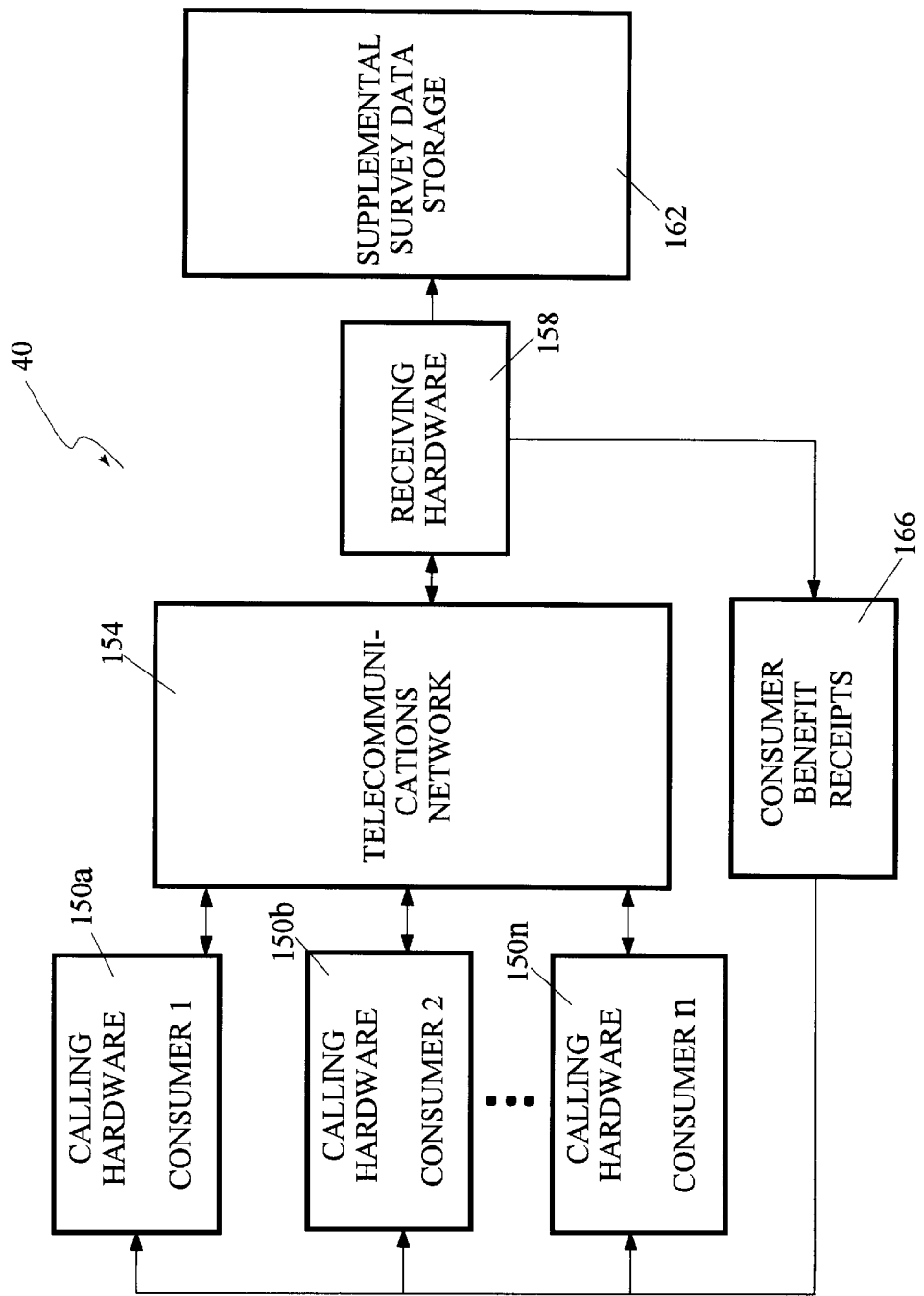
FIG. 5 is a block diagram of the supplemental survey network.

Reference is now made to FIG. 5 to describe further the supplemental survey network 40. This network is characterized by consumer initiation of the input of additional marketing-related information to the system 20. The supplemental survey network 40 includes calling hardware 150 that is utilized by the consumer in providing such information to the system 20. As illustrated in FIG. 5, the calling hardware is commonly comprised of a plurality of calling hardware 150a, 150b . . . 150n. Such calling hardware 150 is conventional or other communication equipment that is available to consumers in their respective households, such as regular telephone equipment, cellular phones and/or computer equipment that is able to communicate, for example, via the Internet. Each of the calling hardware 150 communicates with a telecommunications network 154 that is comparable or equivalent to the previously noted telecommunications networks 60, 132 that were previously noted. The telecommunications network 154 communicates with at least one receiving hardware 158, which can be located at the same system facility that has the caller hardware 56 of the telecommunications survey network 28. The receiving hardware 158 may also be the same as, or equivalent to, the caller hardware 56. The output of the receiving hardware 158, which includes marketing data from the particular consumer that is providing such data using calling hardware 150, is input to a supplemental survey data storage 162, which can also be defined as being part of the database network 24. That is, the supplemental survey data storage 162 need not be separate memory for storing marketing data but can be a portion of the database network which stores, in a desired and predetermined format and categories, the data that is received from each consumer using the calling hardware 150.

As is also conveyed by FIG. 5, the supplemental survey network 40 will send one or more consumer benefit receipts 166 to each or at least some of those consumers that provide the supplemental or additional marketing data. Such consumer benefit receipts are intended to promote or otherwise provide incentives to the consumers so that they utilize the supplemental survey network 40 by providing marketing information useful to the providers 48. Such consumer benefit receipts are comparable or equivalent to those output by the consumer benefit receipt printer/output 112 of the interactive apparatus 100. Accordingly, the number and kind of consumer benefit receipts 166 are a function of the information and responses that are provided to the receiving hardware 158. In that regard, there is a bi-directional communication between the receiving hardware 158 and the calling hardware 150 through the telecommunications network 154. Although each consumer initiates the incoming transmission using the calling hardware 150 to the receiving hardware 158, the supplemental survey network 40 has the capability of bi-directional communication in that the receiving hardware 158 is able to reply to the particular consumer that has contacted the receiving hardware using the particular calling hardware 150. In that regard, upon receipt of an incoming transmission or call from particular calling hardware 150, the receiving hardware 158, as part of its operating procedures, is able to send replies and inquiries to the particular consumer at that consumer's calling hardware 150. Depending upon the information obtained from the particular consumer, determinations can be made related to the number and kind of consumer benefit receipts 166 that should be sent to that consumer. The receiving hardware 158 may require manual intervention in the form of a system worker being involved in the receiving and conveying of communications. Alternatively or additionally, such receiving hardware can include automatic operations by which, depending on information or data received, certain predetermined algorithms can be invoked which have predetermined steps related to survey questions that are asked of the particular consumer and the triggering of predetermined consumer benefit receipts 166 that are to be sent.

Figure 6:
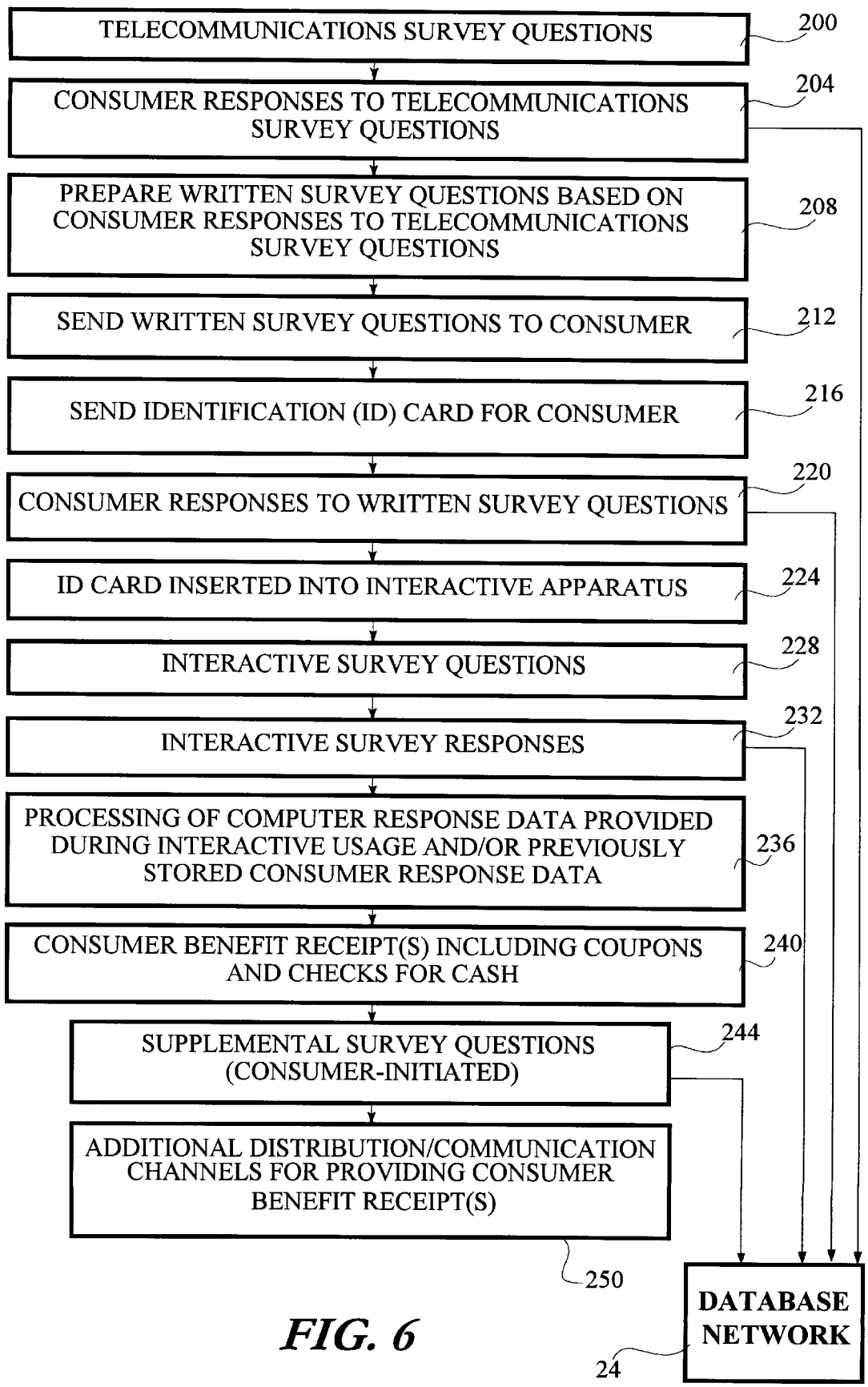
FIG. 6 is a flow diagram illustrating major steps related to the operation of the present invention.

With reference to FIG. 6, the operation of the system 20 is next described in the context of major sequential steps that are typically undertaken in using the system 20. The ultimate outcome of the operational steps involve the customized or semi-customized targeting of each of a number of consumers in which one or more providers 48 directs marketing efforts towards one or more particular consumers, based on marketing data that is gathered from these consumers by means of a variety of different survey networks.

At step 200, the system 20 typically initiates contact with each of a number of identified households or consumers by asking survey questions using the telecommunications survey network 28. These survey questions usually obtain, as well as verify, preliminary information about the particular consumer and his/her interest in participating in the features or advantages of the system 20. Consumer responses are received to such survey questions at step 204 and, particularly where a threshold interest level is obtained from the particular consumer, such preliminary consumer information or marketing data is input to the database network 24 where it is typically stored in an organized manner for ready access and use, such as combining with other marketing data for the particular consumer that is subsequently gathered. With the certain level of interest that is met by a particular consumer, at step 208, written survey questions are prepared for sending to such a consumer. The written survey questions for a particular consumer can be identical, or substantially identical, to those written survey questions that are sent to other consumers. The written survey questions can also be somewhat customized, based on responses that have already been received from this particular consumer. With the preparation of the written survey questions completed, they are sent to this consumer, in accordance with step 212. Preferably also, an identifying unit, such as the ID card 84, is sent to the consumer with the written survey questions, which ID card 84 is useful to the system 20 whenever the particular consumer wishes to participate in system activities, as noted at step 216.

After the written survey questions are received by the particular consumer, it is expected that this consumer will consider responses to the written survey questions at step 220 and send this marketing data back to the system 20. The responses to written survey questions are usually automatically entered for processing and analysis in connection with preparing such data to be stored using the database network 24. This information is typically different from that obtained from the telecommunications survey questions at step 200 and is substantially more detailed in the amount of information that is gathered for use in targeting particular consumers with certain products and/or services offered by the providers 48. Now that the consumer has a system ID card 84, it can be utilized with the interactive apparatus survey network 36 by invoking or activating one of the interactive apparatus 100 that is located at a convenient distance from the household of this particular consumer. For example, when the consumer does grocery shopping, such an interactive apparatus 100 is located at or near this store. At step 224, the ID card 84 is inserted into an interactive apparatus 100 to begin consumer participation with this survey network 36. As previously explained, the interactive apparatus 100 includes the capability of presenting further survey questions, in accordance with step 228. The form and content of such questions can be a function of a number of factors including previous marketing information that was gathered about this particular consumer and which can be correlated with the particular consumer, based on the identifying data found with the ID card 84. Such survey questions can also include general or specific inquiries that were previously not made of this particular consumer and/or questions that have been identified for asking by one or more of the providers 48. At step 232, the consumer inputs responses to the interactive survey questions, which input can be accomplished, for example, using the touch-activated screen of the display 124. As can be appreciated, steps 228, 232 can be conducted sequentially through a series of questions and responses. Preferably, responses to one series of questions can control the content of the next series of questions that are to be asked or displayed. In accordance with step 236, the interactive apparatus 100 may be involved in processing or the determination of interactive survey questions that are based on previously obtained marketing data and/or data that is being provided currently with this particular insertion of the ID card 84. Although not critical, it is preferable that some marketing data already be correlated with the particular consumer at the time the particular consumer first uses his/her ID card 84 with an interactive apparatus 100 At virtually any time during the operation of the interactive apparatus 100, after the ID card 84 is inserted, a determination can be made by the apparatus 100 to output one or more consumer benefit receipts. For example, upon reading the ID card 84 of the particular consumer, and based on previously gathered data from this consumer, one or more providers may have requested the system 20 to prepare and output one or more coupons that enable this consumer to receive discounts for certain products and/or services when they are purchased. Additionally or alternatively, the interactive apparatus 100 might offer incentives to this consumer so that the consumer responds to interactive survey questions in a way useful to one or more providers 48. Such incentives might take the form of one or more checks that can be endorsed by the consumer for cash.

A further source of marketing data for each consumer that is a participant in the programs of the system 20 is the use of the supplemental survey network 40 at step 244. The consumer initiates a contact with the system 20 in connection with initiating the providing of supplemental or additional marketing data associated with that consumer. Like the other networks from which survey questions receive responses, the data from these questions are also input to the database network 24. Finally, in step 250, similar to the interactive apparatus 100, one or more consumer benefit receipts are sent to the consumer that has provided additional marketing information that benefits one or more of the providers 48, based on the consumer's input using the supplemental survey network 40.

The foregoing discussion has been presented for purposes of illustration and description. Further, the description is not intended to limit the invention to the form disclosed herein. Variations and modifications commensurate with the above teachings, within the skill and knowledge of the relevant art, are within the scope of the present invention. The embodiments hereinabove are further intended to explain the best modes presently known of practicing the invention and to enable others skilled in the art to utilize the invention as presented, or in other embodiments, and with the various modifications required by the particular applications or uses of the invention. It is intended that the appended claims be construed to conclude alternative embodiments to the extent permitted by the prior art.

What is claimed is:

1. A method for obtaining and responding to information from a number of consumers including a first consumer and a second consumer, comprising:

obtaining information from the first consumer using at least one of first written survey questions and first telecommunications survey questions;

obtaining information from the second consumer using at least one of second written survey questions and second telecommunications survey questions;

storing information related to the first consumer's responses to said at least one of said first written survey questions and said first telecommunications survey questions in data storage means;

storing information related to the second consumer's responses to said at least one of said second written survey questions and said second telecommunications survey questions in said data storage means;

supplying, after said step of obtaining information from the first consumer, a first identification card to the first consumer, said first identification card having identification information related to the first consumer;

supplying a second identification card to the second consumer, said second identification card having second identification information related to the second consumer;

receiving, for the first time, said first identification card for the first consumer in an interactive apparatus;

generating a first coupon having specific first product information, expiration information and discount information in response to said first identification card and under control of said interactive apparatus, said first coupon to be redeemed when the first product is purchased by the first consumer;

generating at least a first benefit receipt different from and separate from said first coupon, after said step of receiving said first identification card and under control of said interactive apparatus, said first benefit receipt being generated by said interactive apparatus after said interactive apparatus receives a response from the first consumer to at least a first interactive survey question, with said first interactive survey question being different from any specific product that can be purchased by the first consumer and being different from identification information related to the first consumer;

receiving, for the first time, said second identification card for the second consumer in said interactive apparatus; and generating a second coupon having specific second product information, expiration information and discount information after said step of receiving said second identification card, with data previously stored for the second consumer being relied on in generating said second coupon, with said data relied on being obtained from said at least one of said second telecommunications survey questions and said second written survey questions.

2. A method, as claimed in claim 1, wherein:

said step of obtaining information from the first consumer includes requesting information about marketing factors related to the first consumer, with said marketing factors selected from a group that includes food products, favorite brands, income, occupation, hobbies, magazines, appliances, organizations, vehicles and smoking habits.

3. A method, as claimed in claim 1, wherein:

said step of obtaining information from the first consumer includes obtaining information using each of said first written survey questions and said first telecommunications survey questions and said first written survey questions include questions that are different from said second written survey questions.

4. A method, as claimed in claim 1, wherein:

said step of generating said at least first benefit receipt includes storing data related to the first consumer's response to said first interactive survey question in said data storage means.

5. A method, as claimed in claim 1, further including:

downloading information to said interactive apparatus based on said data that was previously stored related to the first consumer.

6. A method, as claimed in claim 1, further including:

initiating supplemental survey questions by the first consumer to provide data from the first consumer and storing said data from said supplemental survey questions in said data storage means.

7. A method, as claimed in claim 1, further including:

inquiring of the second consumer using at least a second interactive survey question different from said first interactive survey question and outputting a second benefit receipt to the second consumer that is different from the first benefit receipt and in which said second benefit receipt is based on different responses received from said at least one of said second written survey questions and said second telecommunications survey questions.

8. A method, as claimed in claim 2, wherein:

said step of supplying said first identification card includes incorporating additional information with said first identification card of the first consumer and said additional information includes information received from the first consumer directed to said marketing factors.

9. A system for obtaining and responding to information from a number of consumers including a first consumer and a second consumer, comprising:

an interactive apparatus that includes at least each of the following:

an identification device that receives a first identification card from the first consumer and ascertains identifying information related to the first consumer and that receives a second identification card from the second consumer and ascertains identifying information related to the second consumer;

a managing apparatus that provides each of the following:

after said first identification card is received by said identification device, controls generation of at least a first coupon having specific product information, expiration information and discount information and controls generation of at least a first benefit receipt that is different from and separate from said first coupon; and after said second identification card is received by said identification device, controls generation of a second coupon having specific product information, expiration information and discount information;

a printer for printing said at least first benefit receipt and, for printing said first coupon and for printing said second coupon;

an output device for providing survey questions including a first survey question; and an input device by which a response to at least said first survey question is entered by the first consumer, said at least first benefit receipt being printed by said printer after a response is input to at least said first survey question by the first consumer using said input device and wherein at least said first survey question is directed to one of opinion information and general product information.

10. A system, as claimed in claim 9, wherein:

said managing apparatus monitors whether the first consumer previously responded to said at least first survey question.

11. A system, as claimed in claim 9, wherein:

said managing apparatus is involved in generating another coupon based on said response to said at least first survey question.

* * * * *